United States Patent
Niida et al.

(10) Patent No.: US 6,836,368 B2
(45) Date of Patent: Dec. 28, 2004

(54) WEDGE PLATE TYPE LIGHT GUIDING PLATE FOR FRONT LIGHT AND METHOD FOR MANUFACTURING THE LIGHT GUIDING PLATE

(75) Inventors: Eiki Niida, Kariya (JP); Fumikazu Isogai, Kariya (JP); Yasuya Mita, Kariya (JP); Norihito Takeuchi, Kariya (JP)

(73) Assignee: Kabushiki Kaisha Toyota Jidoshokki, Kariya (JP)

( * ) Notice: Subject to any disclaimer, the term of this patent is extended or adjusted under 35 U.S.C. 154(b) by 45 days.

(21) Appl. No.: 10/305,473

(22) Filed: Nov. 27, 2002

(65) Prior Publication Data

US 2004/0090764 A1 May 13, 2004

(30) Foreign Application Priority Data

Nov. 30, 2001 (JP) ........................................ 2001-366975

(51) Int. Cl.$^7$ ........................... G02B 27/10; F21V 7/04; F21V 5/00

(52) U.S. Cl. ...................... 359/619; 359/628; 362/31; 362/330

(58) Field of Search ................................. 359/619, 625, 359/628, 618–620, 443, 449, 530, 591, 592, 595, 597, 599; 362/31, 330; 264/1.24, 2.5, 1.27, 1.36; 205/70; 216/24; 427/163.1

(56) References Cited

U.S. PATENT DOCUMENTS

| 6,341,872 B1 | 1/2002 | Goto ............................ 362/31 |
| 6,507,378 B1 * | 1/2003 | Yano et al. ..................... 349/63 |

FOREIGN PATENT DOCUMENTS

| JP | 10-208529 | 8/1998 | ............. F21V/8/00 |
| JP | 2000-21224 | 1/2000 | ............. F21V/8/00 |
| JP | 2000-111900 | 4/2000 | ......... G02F/1/1335 |
| JP | 2000-310777 | 11/2000 | ......... G02F/1/1335 |
| JP | 2001-66592 | 3/2001 | |
| JP | 2001-202813 | 7/2001 | ............. F21V/8/00 |
| JP | 2001-281460 | 10/2001 | ............. G02B/6/00 |

* cited by examiner

Primary Examiner—Hung Xuan Dang
Assistant Examiner—Joseph Martinez
(74) Attorney, Agent, or Firm—Morgan & Finnegan, LLP

(57) ABSTRACT

A light guiding plate guides light from a light source and irradiates the light onto a display portion. The light guiding plate has an incidence plane, an opposite end plane opposite to the incidence plane, an exit plane facing the display portion, and a reflection-exit plane opposite to the exit plane. A plurality of grooves are formed on the reflection-exit plane. The depth of the grooves monotonously increases from the incidence plane toward the opposite end plane. Each groove is defined by intersecting first and second planes. In each groove, the angle defined by the first plane and the exit plane is substantially equal to that of the other grooves. In each groove, the angle defined by the first plane and the second plane is substantially equal to that of the other grooves. This waveguide increases the brightness and improves the uniformity of brightness distribution.

6 Claims, 3 Drawing Sheets

WEDGE PLATE TYPE LIGHT GUIDING PLATE FOR FRONT LIGHT AND METHOD FOR MANUFACTURING THE LIGHT GUIDING PLATE

BACKGROUND OF THE INVENTION

The present invention relates to a wedge plate type light guiding plate for a front light and a method for manufacturing the light guiding plate.

To reduce the power consumption, some conventional display units have a lighting device. When there is sufficient outside light such as sunlight or room lighting, this type of display unit uses outside light. When the outside light is insufficient, the display unit uses the lighting device. Such display units include a reflective display unit with a front light.

FIG. 6 shows a reflective display unit 50 with a front light. The display unit 50 includes a light source 51, a light guiding plate 52, and a reflective liquid crystal panel 60. The light guiding plate 52 has an incident plane 54, a first exit plane 53, and a second exit plane 55. The liquid crystal panel 60 is located below the first exit plane 53. A considerable number of grooves 57 having saw-tooth cross-section are formed on the second exit plane 55. Each groove 57 is defined by a light admission plane 57a and an inclined plane 57b. The light admission plane 57a is inclined by an angle $\gamma$ relative to the first exit plane 53. The inclined plane 57b is inclined by an angle $\alpha$ relative to the first exit plane 53. The light admission plane 57a and the inclined plane 57b form an apex angle $\beta$.

To improve the visibility of the reflective liquid crystal panel 60, it is desirable that the brightness of the panel 60 be enhanced and the brightness distribution of the panel 60 be uniform.

Brightness uniformity is an index representing the evenness of a brightness distribution. To compute the brightness uniformity, the values of brightness at specific points on the light guiding plate 52 are measured. The brightness uniformity is computed based on the maximum value and the minimum value of the measured brightness. Specifically, the brightness uniformity is computed in the following manner. First, the surface of the light guiding plate 52 is divided into sixteen sections by three parallel lines and another three lines perpendicular to the first three lines. The brightness at each of the nine intersection points L1 to L9 is measured. Then, the minimum brightness is divided by the maximum brightness. The resultant represents the brightness uniformity. The closer to one the resultant is, the smaller the difference between the minimum brightness and the maximum brightness is, that is, the more uniform the brightness distribution is.

However, since the amount of light that reaches regions far from the light source 51 is small, the amount of light reflected by the light admission planes 57a in the region is small. Accordingly, only a small amount of light exits from the first exit plane 53 in the regions far from the light source 51. This results in a reduced brightness and an uneven brightness. In other words, the brightness distribution is uneven. Japanese Laid-Open Patent Publication No. 2000-21224 discloses a wedge plate type light guiding plate having improved brightness and brightness uniformity. Japanese Laid-Open Patent Publication No. 2000-111900 discloses a flat plate type light guiding plate having improved brightness and brightness uniformity.

Specifically, in the light guiding plate 52 of the publication No. 2000-21224, the pitch of the grooves 57 is randomly varied. The randomly varied pitch and the wedge shape of the light guiding plate make the brightness uniform. On the other hand, in the flat plate type light guiding plate of the publication No. 2000-111900, the depth of the grooves increases as the distance from the light source 51 increases, while the pitch of the grooves is constant. Also, as the distance from the light source 51 increases, the inclination angle a gradually increases from 0.5° to 3.5° or the inclination angle $\beta$ increases from 40° to 60°.

In the light guiding plate disclosed in the publication No. 2000-21224 having a varying groove pitch, smaller pitch of the grooves 57 makes the brightness distribution uniform. However, if the pitch does not match the pixel pitch of the reflective liquid crystal panel 60, interference patters will appear. Also, since the groove pitch randomly varies, emission lines appear in regions where the pitch is greatly varied. Interference patterns and emission lines both degrade the visibility.

In the flat plate type light guiding plate disclosed in the publication No. 2000-111900, the apex angle $\beta$ changes if the groove depth increases and the angle $\alpha$ or the angle $\gamma$ changes. In this case, since the angle $\alpha$ or the angle $\gamma$ changes, the brightness distribution cannot be easily made uniform. Since the apex angle $\beta$ changes, the brightness does not increase even if the groove depth increases. If the apex angle $\beta$ changes, manufacture of a mold for forming the light guiding plate will be complicated, and the accuracy of the mold will be degraded.

SUMMARY OF THE INVENTION

Accordingly, it is a first objective of the present invention to provide a wedge plate type light guiding plate for front light, which waveguide increases the brightness and improves the uniformity of brightness distribution while preventing interference patterns from appearing.

A second objective of the present invention is to provide a method for manufacturing a wedge type light guiding plate for front light, which method facilitates forming of an accurate mold and permits apex angles defined by peaks and bottoms forming grooves in the light guiding plate to be accurately formed as designed.

To achieve the foregoing and other objectives and in accordance with the purpose of the present invention, the invention provides a wedge plate type light guiding plate for a front light mounted on a reflective display unit having a display portion. The light guiding plate guides light from a light source and irradiates the light onto the display portion. The light guiding plate has an incidence plane, an opposite end plane, an exit plane facing the display portion and a reflection-exit plane. The incidence plane permits light to enter the light guiding plate. The opposite end plane opposites to the incidence plane. Light entering the light guiding plate through the incidence plane exits through the exit plane toward the display portion. The reflection-exit plane opposites to the exit plane. Light reflected on the display portion passes through the exit plane and the reflection-exit plane. A plurality of grooves are formed on the reflection-exit plane. The grooves extend in a direction parallel to the direction in which the incidence plane extends, and are arranged at a predetermined pitch in a direction perpendicular to the direction in which the incidence plane extends. The depth of the grooves monotonously increases from the incidence plane toward the opposite end plane. Each groove is defined by intersecting first and second planes. The first plane is inclined such that the distance between the exit plane and the first plane increases as the distance from the light source increases. In each groove, the angle defined by the first plane and the exit plane is substantially equal to that of the other grooves. In each groove, the angle defined by the first plane and the second plane is substantially equal to that of the other grooves.

The invention also provides a method for manufacturing a wedge plate type light guiding plate for a front light mounted on a reflective display unit having a display portion. The light guiding plate includes an incidence plane for permitting light to enter the light guiding plate, an opposite end plane opposite to the incidence plane, an exit plane facing the display portion, and a reflection-exit plane opposite to the exit plane. A plurality of grooves having a saw-tooth cross-section are formed on the reflection-exit plane. The grooves extend in a direction parallel to the direction in which the incidence plane extends, and are arranged at a predetermined pitch in a direction perpendicular to the direction in which the incidence plane extends. The method comprising: preparing mold for molding the light guiding plate, wherein the mold has a plurality of peaks that correspond to the grooves, wherein each peak is defined by intersecting first and second planes, wherein the first plane is inclined such that the distance between the exit plane of the light guiding plate to be molded and the first plane increases as the distance from the incidence plane of the light guiding plate to be molded increases, wherein the first plane of each peak is parallel to the first planes of the other peaks, and wherein the angle defined by the first and second planes of each peak is equal to that of the other peaks; and injection molding the light guiding plate using the mold.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A reflective liquid crystal display unit 1 according to one embodiment of the present invention will now be described with reference to FIGS. 1 to 5.

Figure 1:
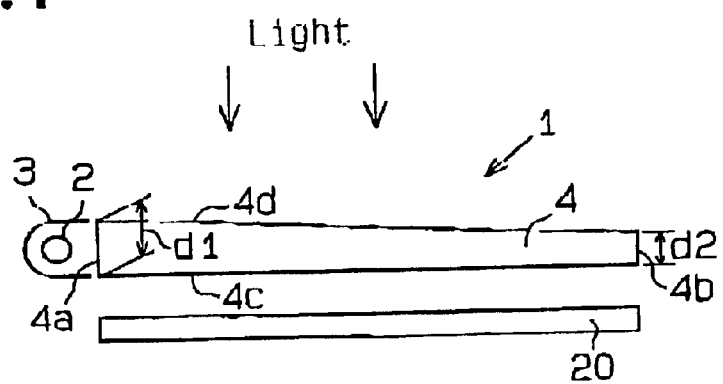
FIG. 1 is a schematic cross-sectional view showing a reflective liquid crystal display unit.

As shown in FIG. 1, the reflective liquid crystal display unit 1 includes a light source 2, a reflector 3 covering the light source 2, a wedge plate type light guiding plate 4, and a liquid crystal panel 20. A cold cathode tube is used as the light source 2. The inner surface of the reflector 3 is open to the light guiding plate 4 and is formed with a material with high reflectivity to reflect the light from the light source 2 toward the light guiding plate 4. The light source 2 is arranged to face an incidence plane 4a of the light guiding plate 4.

A high transparency material, for example, an acrylic sheet, is used as the light guiding plate 4. The liquid crystal panel 20 is arranged to face a exit plane 4c of the light guiding plate 4. The cross-section of the light guiding plate 4 perpendicular to the incidence plane 4a is substantially shaped like a wedge. Specifically, the incidence plane 4a is substantially perpendicular to the exit plane 4c. The thickness d1 of the light guiding plate 4 at the incidence plane 4a is greater than the thickness d2 of the light guiding plate 4 at an opposite end plane 4b opposite to the incidence plane 4a (d1>d2). Therefore, the light guiding plate 4 is formed such that a reflection-exit plane 4d, which is opposite to the exit plane 4c, approaches the exit plane 4c from the incidence plane 4a to the opposite end plane 4b.

The inclination angle of the reflection-exit plane 4d relative to the exit plane 4c is small. However, for purposes of illustration, the inclination is exaggerated in FIG. 1.

Figure 2:
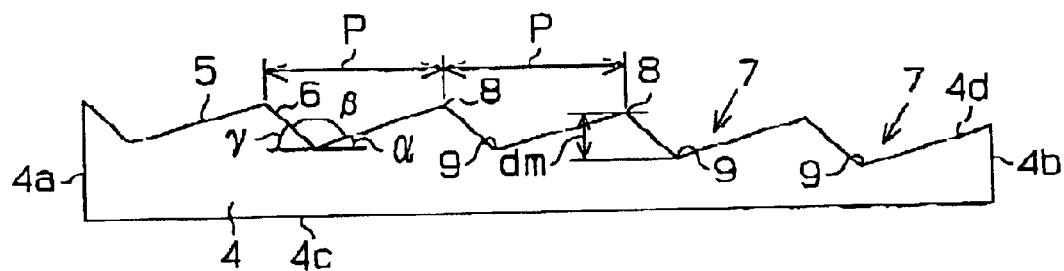
FIG. 2 is a schematic cross-sectional view showing the light guiding plate of FIG. 1.
Figure 3:
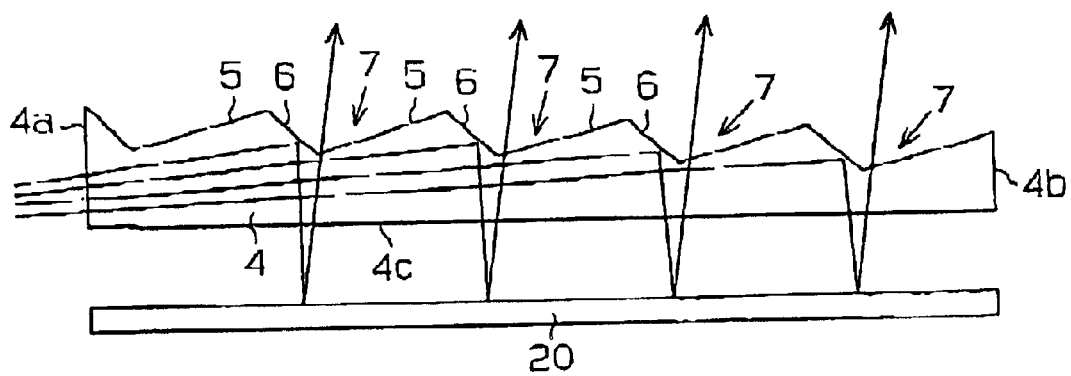
FIG. 3 is a schematic cross-sectional view showing the operation of the light guiding plate shown in FIG. 1.

FIG. 2 is an enlarged cross-sectional view illustrating the light guiding plate 4. As shown in FIG. 2, a considerable number of grooves 7 having saw-tooth cross-section are formed on the reflection-exit plane 4d. The grooves 7 are arranged substantially parallel to the incidence plane 4a. Each groove 7 has a first plane and a second plane. In this embodiment, the first plane is an inclined plane 5, and the second plane is a light admission plane 6. The inclined plane 5 is inclined relative to the exit plane 4c by an angle α. The light admission plane 6 is inclined relative to the exit plane 4c by an angle γ. The planes 5, 6 form an apex angle β. The inclined plane 5 is inclined such that the distance between the inclined plane 5 and the exit plane 4c increases as the distance from the light source 2 increases, or from the incidence plane 4a toward the opposite end plane 4b. The angle α, which is defined by the inclined plane 5 and the exit plane 4c, is in the range from approximately 1° to approximately 5°. Each light admission plane 6 is inclined such that the distance between the light admission plane 6 and the exit plane 4c decreases as the distance from the light source 2 increases. The inclination angle γ is in the range from approximately 41° to approximately 47°. The inclination angle α and the apex angle β are the same for all the grooves 7. In other words, the inclination angle α and the apex angle β of a given one of the grooves 7 is substantially equal to the inclination angle a and the apex angle β of the other grooves 7.

The first and second inclined planes 5, 6 form peaks 8 and bottoms 9. The pitch P of the peaks 8 is constant. The grooves 7 are arranged at a predetermined pitch P in a direction perpendicular to the direction in which the incidence plane 4a extends. The pitch P preferably matches the pixel pitch of the liquid crystal of the panel 20. The groove depth dm of each groove 7 is defined as the distance between a line that includes the corresponding peak 8 and that is parallel to the exit plane 4c and a line that includes the bottom 9 and that is parallel to the exit plane 4c. The groove depth dm gradually increases from the incidence plane 4a toward the opposite end plane 4b.

The groove depth dm of each adjacent pair of the grooves 7 is determined to monotonously increase from the side corresponding to the incidence plane 4a toward the opposite end plane 4b. More preferably, the groove depth dm is increased by one of two- to five-dimensional functions. Most preferably, the groove depth dm is increased by a three-dimensional function.

In this embodiment, an increase of the groove depth dm by an n-dimensional function refers to a configuration in which the groove 7 closest to the incidence plane 4a is set as a reference point and the groove depth dm increases from the depth of the reference point groove 7 by an amount that is proportional to nth power of the distance from the reference point. That is, when the distance from the groove 7 closest to the incidence plane 4a is denoted by x, and the depth of the groove 7 closest to the incidence plane 4a is denoted by b, the relationship between the groove depth dm and the distance x is represented by the equation ($dm=ax^n+b$). a is a coefficient and has a positive value. n need not be an integer but may be a real number.

Therefore, when the groove depths dm of three consecutive grooves 7 are measured, the difference between the depth dm of the groove 7 closest to the opposite end plane 4b and the middle groove 7 is greater than the difference between the depth dm of the middle groove 7 and the groove 7 closest to the incidence plane 4a. Preferably, the rate of change between the depth dm of a groove 7 closer to the incidence plane 4a and the adjacent groove 7 closer to the opposite end plane 4b is less than 2%. More preferably, the rate of change is 0.4% or less. In this embodiment, the increase rate of the groove depth dm refers to the rate of increase of the groove depth dm from one of the grooves 7 to the adjacent one of the grooves 7 that is farther from the incidence plane 4a.

The pitch P is 1 mm or less. However, for purposes of illustration, the pitch P is exaggerated in FIG. 2. Therefore, in reality, a considerable number of the grooves 7 are formed on the light guiding plate 4. Likewise, for purposes of illustration, the ratio of the groove depth dm relative to the thickness of the light guiding plate 4 is exaggerated. Also, the rate of change of the groove depth dm, that is, the differences between a groove 7 and adjacent grooves 7 are exaggerated.

A method for manufacturing the light guiding plate 4, which is constructed as above, will hereafter be described.

The light guiding plate 4 is manufactured through injection molding using a mold. The mold has a shape that corresponds to that of the light guiding plate 4. Specifically, the mold has grooves 12 formed at the constant pitch P, and the inclination angle forming the grooves 12 and the apex angle of the grooves 12 are constant.

Figure 4:
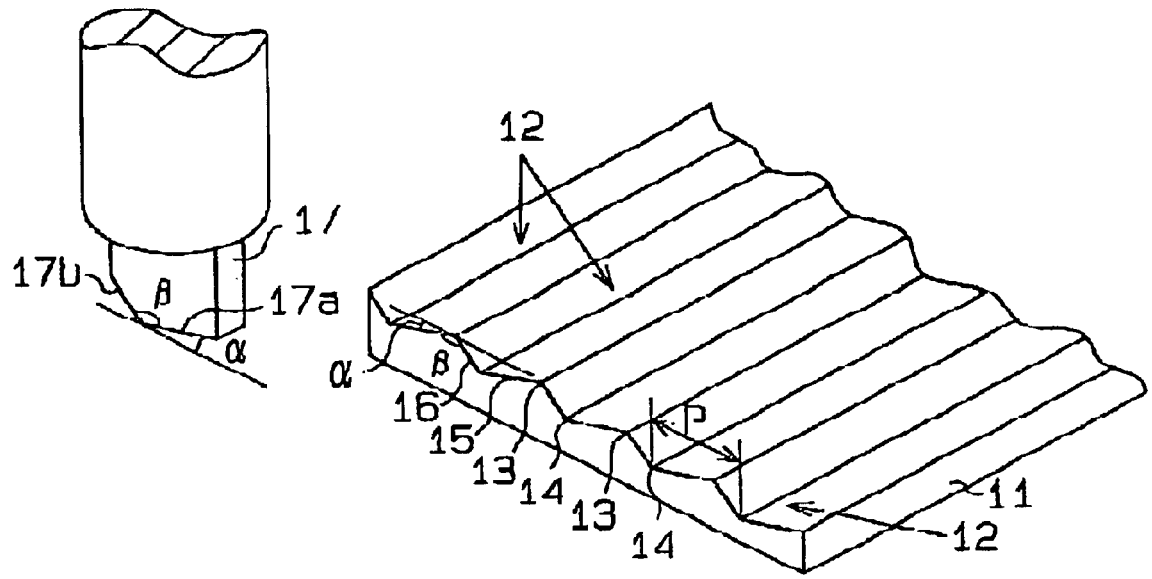
FIG. 4 is a schematic perspective view showing a method for manufacturing a mold for forming the light guiding plate of FIG. 1.

As shown in FIG. 4, the mold is formed by machining a metal plate 11 with a single cutting tool 17 to form a considerable number of the grooves 12. A peak 13 that corresponds to one of the grooves 7 on the light guiding plate 4 is formed between each adjacent pair of the grooves 12. The cutting tool 17 has first and second edges 17a, 17b. The first edge 17a corresponds to the first plane 15 of each peak 13. The second edge 17b corresponds to the second plane 16 of each peak 13. The angle defined by the first edge 17a and a plane that is perpendicular to the axis of the cutting tool 17 is equal to the inclination angle α of the light guiding plate 4. The apex angle defined by the first edge 17a and the second edge 17b is equal to the apex angle β.

First, the cutting tool 17 is reciprocated along a single line on the metal plate 11 to machine the plate 11, thereby forming a groove 12. Since the inclined edge 17a of the blade 17 is inclined by the inclination angle a relative to the bottom surface of the metal plate 11, the inclined surface 15 of the formed groove 12 is inclined by the inclination angle α relative to the bottom surface of the metal plate 11. Since the inclined edge 17a and the inclined edge 17b define the apex angle β, the apex angle of the peak 13 of the formed groove 12 is the apex angle β.

Then, the cutting tool 17 is moved along a direction perpendicular to the direction of the groove 12 by a distance corresponding to the pitch P of the bottoms 14 of the grooves 12. Subsequently, the cutting tool 17 is reciprocated again to form the next groove 12. This process is repeated to form the considerable number of the grooves 12 on the metal plate 11. The depths of the grooves 12 are formed to be gradually changed so that the groove depth dm gradually increases.

Figure 5:
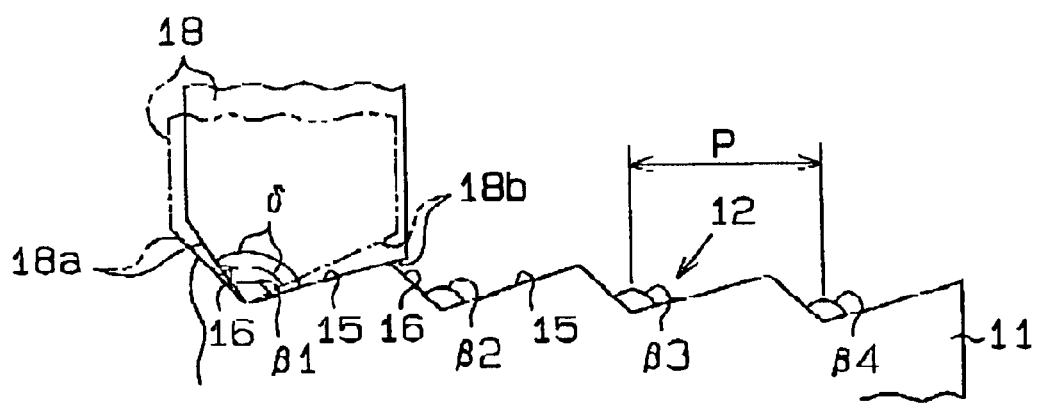
FIG. 5 is a diagrammatic view showing a method for forming grooves when the groove apex angle β of the mold changes.
Figure 6:
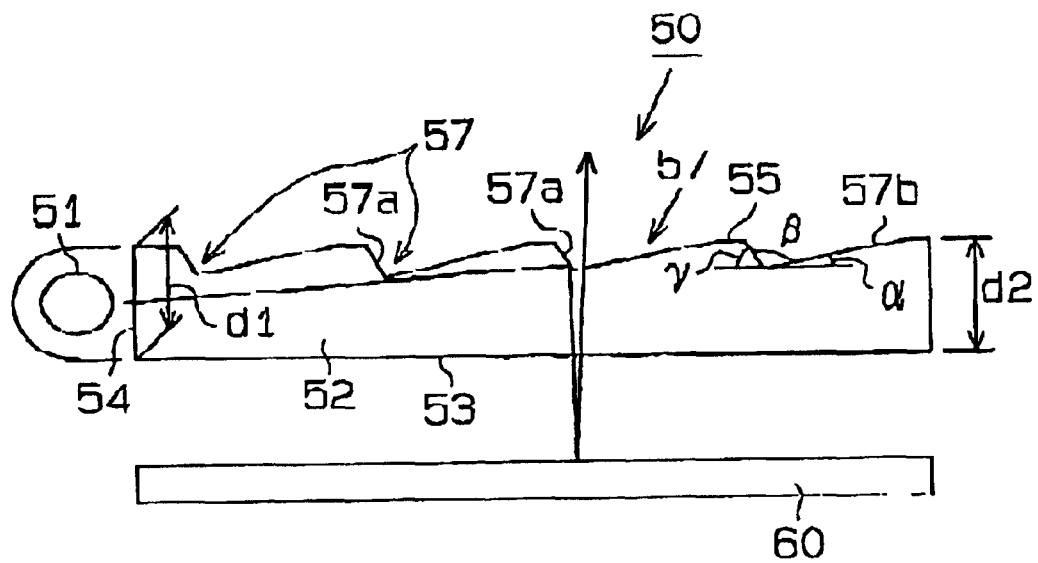
FIG. 6 is a schematic cross-sectional view showing a prior art reflective liquid crystal display unit.
Figure 7:
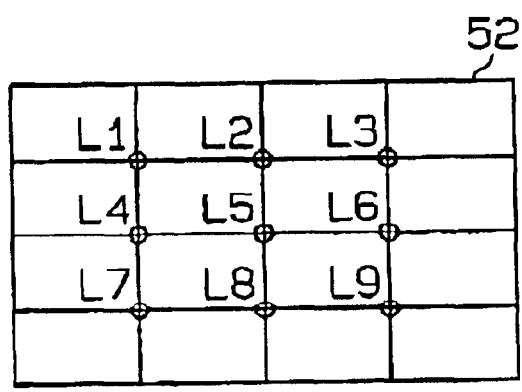
FIG. 7 is a diagram showing brightness distribution.

If the groove depth dm gradually increases while maintaining the pitch P as in the flat plate type light guiding plate disclosed in Japanese Laid-Open Patent Publication No. 2000-111900, the apex angle β varies. In this case, the apex angle β of the mold must be varied. That is, different apex angles β1, β2, β3, β4 are used ($\beta1 \neq \beta2 \neq \beta3 \neq \beta4$). Therefore, a plurality of cutting tools need be prepared. Alternatively, one groove need be formed by repeating machining twice or more. For example, as shown in FIG. 5, a cutting tool 18 having an apex angle δ ($\delta < \beta1$) is prepared. First, machining is performed with the cutting tool 18 inclined as shown by broken line in FIG. 5 so that one blade 18a of the cutting tool 18 forms the inclined plane 16 of the groove 12. Next, the angle of the cutting tool 18 is changed so that the other blade 18b forms the inclined plane 15 and machining is performed to form the groove 12. However, in this case, the inclined plane 15 and the inclined plane 16 are not machined simultaneously by the cutting tool 18, but machined in two separate machining processes. Since the position of the bottom 14 is likely to be displaced between the two processes, accurate machining of the grooves 12 is difficult.

The operation of the above display unit 1 will now be described.

When there is sufficient outside light such as sunlight or room lighting, the display unit 1 uses the outside light. When the outside light is insufficient, the display unit 11 uses the light source 2. As shown in FIG. 1, the outside light enters the light guiding plate 4 through the reflection-exit plane 4d. The outside light then exits the light guiding plate 4 through the exit plane 4c and is irradiated onto the liquid crystal panel 20. When light from the light source 2 enters the light guiding plate 4 through the incidence plane 4a, the light advances through the light guiding plate 4. Light that reaches each light admission plane 6 is totally reflected at an angle that is close to an right angle relative to the exit plane 4c and exits through the exits the waveguide 4 from plane 4c.

The light irradiated onto the liquid crystal panel 20 is reflected by the panel 20 and reenters the light guiding plate 4. The light then passes through the light guiding plate 4 and exits the light guiding plate 4 through the reflection-exit plane 4d. The light then becomes visible.

As the distance from the light source 2 increases, the amount of light advancing through the light guiding plate 4 decreases. However, since the groove depth dm is configured to monotonously increase toward the opposite end plane 4b, the area of the second inclined planes 6 in regions far from the light source 2 is large. Thus, a sufficient amount of light is reflected by the second inclined planes 6. Since the inclination angle α and the apex angle β are constant, the brightness distribution is made uniform and the brightness increases.

A wedge plate type light guiding plate 4 that has a length of 65 mm, a width of 80 mm, a thickness d1 of 1 mm, a thickness d2 of 0.7 mm, and a pitch P of 0.24 mm was prepared. The prepared light guiding plate 4 had saw-tooth cross-section grooves 7 having an inclination angle α of approximately 2°, and an apex angle β of approximately 134°. The groove depth dm was configured to gradually increase from 5.5 µm to 11 µm. The maximum value of change between an adjacent pair of the grooves 7 was set to 0.04 µm.

Experiments in which the groove depth dm was varied were performed. When the rate of change was 2% or less, the lines of the grooves 7 were not visible. In this example, the rate of change of the groove depth dm was less than 0.4%, and the lines were not visible as a matter of course.

The brightness and the brightness uniformity was compared between a case where the inclination angle a was constant and a case where the inclination angle α was varied. When the brightness with the constant inclined angle α was set as 1, the relative value of the brightness with the varied inclined angle α was 0.85. When the brightness uniformity with the constant inclined angle α was set as 1, the relative value of the brightness uniformity with the varied inclined angle α was 0.95. From the result, it was confirmed that the constant inclination angle α increases the brightness and makes the brightness distribution uniform.

This embodiment provides the following advantages.

(1) In the light guiding plate 4, the groove depth dm is formed to monotonously increase. Thus, in regions far from the light source 2, a sufficient amount of light exits from the exit plane 4c. This increases the brightness. Since the inclination angle α and the apex angle β are constant, the brightness increases and the brightness distribution is made uniform. Since the pitch P is constant, a uniform brightness distribution will not cause interference patterns to be created by light reflected by the liquid crystal panel 20 and light reflected by the exit plane 4c.

Since the inclination angle α and the apex angle β are constant, the mold for forming the light guiding plate 4 is easily formed.

(2) If the rate of change of the groove depth dm is 2% or less in an adjacent pair of the grooves 7, the brightness does not change abruptly. Therefore, the lines of the grooves 7, which would be visible due to abrupt changes of the brightness, are substantially invisible. Preferably, if the rate of change is 0.4% or less, the lines will be less visible.

(3) Since the inclination angle and the apex angle of all the grooves 7 are constant, the mold for the light guiding plate 4 is formed with the single cutting tool 17. This simplifies the procedure for forming the mold and reduces the cost. Also, variations in the dimensions of the mold are reduced, which permits the mold to be accurately formed.

Therefore, the defective fraction of the light guiding plate 4 is suppressed and the accuracy is improved.

(4) The grooves 12 is accurately machined by the single mold. Therefore, the roughness of the inclined plane 5 and the roughness of the light admission plane 6 are reduced. Accordingly, dispersion of light at the inclined plane 5 and the light admission plane 6 are suppressed. Therefore, loss of reflected light is reduced, and the brightness increases. Since light dispersion is suppressed, the contrast is enhanced.

(5) Since the pitch of the peaks 8 is constant, the pitch P of the mold is constant. Therefore, when forming the grooves 12 of the mold, the cutting tool 17 is moved at a constant pitch that is equal to the pitch of the bottoms 14. This facilitates the forming of the mold.

(6) In the mold, the inclination angle α of the inclined planes 15 and the apex angle β of the grooves 12 are constant, the mold is formed with the single cutting tool 17. Also, the position of the bottoms 14 is unlikely to be displaced from a desired position. Therefore, the dimensions of the mold are accurate, and, since the light guiding plate 4 is formed with the accurate mold, the apex angle β of the peaks 8 and the bottoms 9 of the grooves 7 are formed as designed.

It should be apparent to those skilled in the art that the present invention may be embodied in many other specific forms without departing from the spirit or scope of the invention. Particularly, it should be understood that the invention may be embodied in the following forms.

The light guiding plate 4 is not limited to an acrylic sheet. As long as the waveguide 4 is transparent, a transparent resin or glass may be used.

Instead of the pitch P of the peaks 8, the pitch of the bottoms 9 may be constant.

Instead of the pitch of the bottoms 14, the pitch of the peaks 13 may be constant in the die.

The pitch P is not limited to 0.24 mm. The pitch P may be changed in accordance with the pixel pitch of the liquid crystal panel 20 if necessary. The pitch P need not be exactly the same as the pixel pitch, but may be different from the pixel pitch as long as interference patterns are not shown.

The thickness d1, the thickness d2, the pitch P, and the groove depth dm are not limited to the values in the example.

The groove depth dm is not necessarily increased by one of two- to five-dimensional functions. However, the groove depth dm may be increased by a combination of the two- to five dimensional functions. That is, the groove dm and the distance x may satisfy the following equation. $dm = ax^n + bx^{(n-1)} + cx^{(n-2)} + \ldots + dx^2 + ex + f$. In this case, functions that increases the groove depth dm toward the opposite end plane 4b are used. The rate of change of the groove depth dm has minimum values, and thus the groove depth dm does not monotonously increase in some regions. However, since the groove depth dm is not constant, the groove depth dm increases as the distance from the light source 2 increases. Thus, the modification has the same advantages as the illustrated embodiment.

When the groove depth dm is changed by any of two- to five dimensional functions, the groove depth dm need not be increased by one of two- to five-dimensional functions in the entire range from the incidence plane 4a to the opposite end plane 4b. That is, the reflection-exit plane 4d may be divided into sections, and the groove depth dm may be increased by a different function in each section. For example, the groove depth dm may be increased by a two-dimensional function in the sections closest to the incidence plane 4a, and the order of the function may be increased to three and then to four as the distance from the incidence plane 4a increases.

The groove depth dm of some of the grooves 7 need not change by two- to five-dimensional functions, as long as the groove depth dm of most of the grooves 7 change by any of two-to five-dimensional functions from the incidence plane 4a toward the opposite end plane 4b.

Therefore, the present examples and embodiments are to be considered as illustrative and not restrictive and the invention is not to be limited to the details given herein, but may be modified within the scope and equivalence of the appended claims.

What is claimed is:

1. A wedge plate type light guiding plate for a front light mounted on a reflective display unit having a display portion, wherein the light guiding plate guides light from a light source and irradiates the light onto the display portion, the light guiding plate comprising:

an incidence plane, which permits light to enter the light guiding plate;

an opposite end plane opposite to the incidence plane;

an exit plane facing the display portion, wherein light entering the light guiding plate through the incidence plane exits through the exit plane toward the display portion; and a reflection-exit plane opposite to the exit plane, wherein light reflected on the display portion passes through the exit plane and the reflection-exit plane, wherein a plurality of grooves are formed on the reflection-exit plane, wherein the grooves extend in a direction parallel to the direction in which the incidence plane extends, and are arranged at a predetermined pitch in a direction perpendicular to the direction in which the incidence plane extends, wherein the depth of the grooves monotonously increases from the incidence plane toward the opposite end plane, wherein each groove is defined by intersecting first and second planes, wherein the first plane is inclined such that the distance between the exit plane and the first plane increases as the distance from the light source increases, wherein, in each groove, the angle defined by the first plane and the exit plane is substantially equal to that of the other grooves, wherein, in each groove, the angle defined by the first plane and the second plane is substantially equal to that of the other grooves, and wherein, in any adjacent pair of the grooves, the rate of increase of the depth of the groove closer to the opposite end plane to the depth of the groove closer to the incidence plane is equal to or less than 0.4%.

2. The light guiding plate according to claim 1, wherein, if the depth of a groove at a given position is denoted by dm, the distance between the groove closest to the incidence plane and the given position is denoted by x, and the depth of the groove closest to the incidence plane is denoted by b, the relationship between the depth din of the groove and the distance x satisfies an equation $dm=ax^n+b$, in which a is a coefficient, and n is an order of function.

3. A light guiding plate for a front light mounted on a reflective display unit having a display portion, wherein the light guiding plate guides light from a light source and irradiates the light onto the display portion, the light guiding plate comprising:

an incidence plane, which permits light to enter the light guiding plate;

an opposite end plane opposite to the incidence plane;

an exit plane facing the display portion, wherein light entering the light guiding plate through the incidence plane exits through the exit plane toward the display portion; and a reflection-exit plane opposite to the exit plane, wherein light reflected on the display portion passes through the exit plane and the reflection-exit plane, wherein a plurality of grooves are formed on the reflection-exit plane, wherein the grooves extend in a direction parallel to the direction in which the incidence plane extends, and are arranged at a predetermined pitch in a direction perpendicular to the direction in which the incidence plane extends, wherein the depth of the grooves monotonously increases from the incidence plane toward the opposite end plane, wherein each groove is defined by intersecting first and second planes, wherein the first plane is inclined such that the distance between the exit plane and the first plane increases as the distance from the light source increases, wherein the first plane of each groove is substantially parallel to the first planes of the other grooves, wherein the second plane of each groove is substantially parallel to the second planes of the other grooves, and wherein, in any adjacent pair of the grooves, the rate of increase of the depth of the groove closer to the opposite end plane to the depth of the groove closer to the incidence plane is equal to or less than 0.4%.

4. A method for manufacturing a wedge plate type light guiding plate for a front light mounted on a reflective display unit having a display portion, wherein the light guiding plate includes an incidence plane for permitting light to enter the light guiding plate, an opposite end plane opposite to the incidence plane, an exit plane facing the display portion, and a reflection-exit plane opposite to the exit plane, wherein a plurality of grooves having a saw-tooth cross-section are formed on the reflection-exit plane, wherein the grooves extend in a direction parallel to the direction in which the incidence plane extends, and are arranged at a predetermined pitch in a direction perpendicular to the direction in which the incidence plane extends, the method comprising:

preparing mold for molding the light guiding plate, wherein the mold has a plurality of peaks that correspond to the grooves, wherein each peak is defined by intersecting first and second planes, wherein the first plane is inclined such that the distance between the exit plane of the light guiding plate to be molded and the first plane increases as the distance from the incidence plane of the light guiding plate to be molded increases, wherein the first plane of each peak is parallel to the first planes of the other peaks, wherein the angle defined by the first and second planes of each peak is equal to that of the other peaks, and wherein, the plates that define any adjacent pair of the grooves are arranged such that the rate of increase of the depth of the groove closer to the opposite end plane to the depth of the groove closer to the incidence plane is equal to or less than 0.4%; and injection molding the light guiding plate using the mold.

5. The method according to claim 4, wherein the height of the peaks monotonously increases as the distance from the incidence plane of the light guiding plate to be molded increases.

6. The method according to claim 4, wherein the peaks are formed with a cutting tool, wherein the cutting tool includes a first edge and a second edge, wherein the first edge corresponds to the first plane of one of the peaks, and wherein the second edge corresponds to the second plane of the adjacent peak.

* * * * *